UNITED STATES PATENT OFFICE.

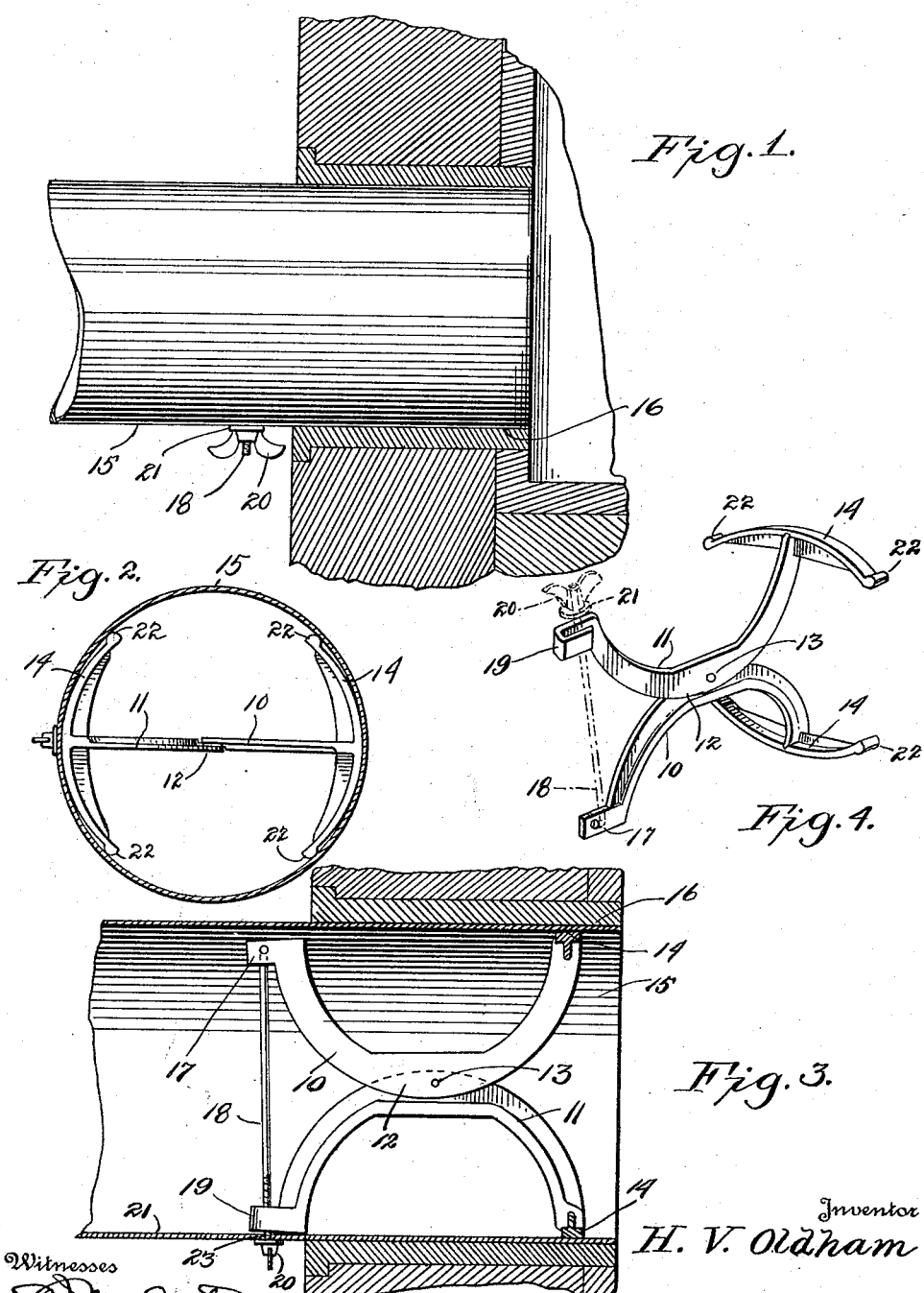

HENRY V. OLDHAM, OF JONESBORO, ARKANSAS.

STOVEPIPE STAY OR CLAMP.

1,191,988.  Specification of Letters Patent.  Patented July 25, 1916.

Application filed December 14, 1915. Serial No. 66,825.

*To all whom it may concern:*

Be it known that I, HENRY V. OLDHAM, a citizen of the United States, residing at Jonesboro, in the county of Craighead, State of Arkansas, have invented certain new and useful Improvements in Stovepipe Stays or Clamps; and I do hereby declare the following to be a full, clear, and exact description of the invention, such as will enable others skilled in the art to which it appertains to make and use the same.

This invention relates to improvements in stove pipe stays or clamps.

The principal object of the invention is to provide a novel and effective device for clamping the end of a pipe section within a flue opening and which can be readily operated from the side of the pipe whereby the inconvenient necessity of reaching in through the other end of the pipe is obviated.

A further object of the invention resides in the provision of a novel device of this character by which a pipe may be frictionally clamped within the flue opening.

Other objects and advantages will be apparent from the following description when taken in connection with the accompanying drawing.

In the drawing: Figure 1 is a side view of a pipe section secured within a flue opening by means of my improved pipe stay, the wall of the flue being shown in section; Fig. 2 is an end view of the device, the pipe being removed from the flue; Fig. 3 is a vertical longitudinal sectional view of what is shown in Fig. 1, and Fig. 4 is a perspective view of the stay removed from the pipe.

Referring particularly to the accompanying drawing, 10 and 11 represent a pair of arcuate members which are arranged back to back in slightly overlapping relation, as shown at 12 and pivotally connected by means of the pin or rivet 13. At one end of each of the arcuate members is a transversely extending arcuate member 14 which engages the inner face of the portion of the stove pipe section 15 disposed within the flue opening 16. At the other end of the member 10 is an apertured lug 17 in which is loosely engaged the hooked end of a bar 18. The corresponding end of the member 11 is formed with a U-shaped lug 19 which receives loosely therein the adjacent end of the bar, said end of the bar being threaded and carrying a winged nut 20 engaging the outer face of the said lug. On the bar, between the nut and the lug, is a washer 21. At each end of each of the arcuate members 14 is a semi-cylindrical knob or projection 22 which engages with the interior of the pipe at a single point. There being four of these projections, the pipe will be clamped at four points, as well as at points where the intermediate portions of the arcuate member engage with the pipe. In one side of the pipe, adjacent the flue is formed an opening 23, and through this opening extends the threaded end of the before-mentioned bar, the washer being disposed between the pipe and the nut.

In the operation of the device, the parts being in the position shown in Fig. 3 to secure the end of the pipe within the flue opening, it is only necessary to turn the wing nut toward the pipe. This rocks the arcuate members 10 and 11 on their pivot which results in the arcuate portions 14 moving outwardly and pressing the pipe tightly against the surrounding wall of the flue opening. To remove the pipe from the opening it is only necessary to turn the nut in the opposite direction so that the members 10 and 11 will be withdrawn from their forcible engagement with the interior of the pipe.

With this construction the inconvenient necessity of reaching in through the outer end of the pipe to operate a clamp is completely obviated, as the complete operation of tightening and loosening the device is accomplished from the outside of the pipe, and at a point adjacent the flue opening. The device can be readily applied to any stove pipe section now manufactured, by simply forming an opening, such as the opening 23 to permit the end of the bar 18 to project for the reception of the winged nut.

What is claimed is:

A stove pipe stay, comprising a pair of pivotally connected arcuate members, the corresponding ends of the said members having transversely extending arcuate portions formed thereon, the other end of one of the members having a movably connected bolt, the corresponding end of the other
5 member having a recess for the reception of the outer end of the bolt, and an adjusting nut carried by the bolt.

In testimony whereof, I affix my signature, in the presence of two witnesses.

HENRY V. OLDHAM.

Witnesses:
R. R. RANKIN,
JOEL T. BERRY.

Copies of this patent may be obtained for five cents each, by addressing the "Commissioner of Patents, Washington, D. C."